United States Patent
Jaaskelainen

(10) Patent No.: US 8,553,211 B2
(45) Date of Patent: Oct. 8, 2013

(54) STIMULATED BRILLOUIN SYSTEM WITH MULTIPLE FBG'S

(75) Inventor: Mikko Jaaskelainen, Katy, TX (US)

(73) Assignee: SensorTran, Inc., Austin, TX (US)

( * ) Notice: Subject to any disclaimer, the term of this patent is extended or adjusted under 35 U.S.C. 154(b) by 0 days.

(21) Appl. No.: 13/503,370

(22) PCT Filed: Oct. 23, 2010

(86) PCT No.: PCT/US2010/002825
§ 371 (c)(1),
(2), (4) Date: Apr. 22, 2012

(87) PCT Pub. No.: WO2011/049630
PCT Pub. Date: Apr. 28, 2011

(65) Prior Publication Data
US 2012/0206718 A1    Aug. 16, 2012

Related U.S. Application Data

(60) Provisional application No. 61/279,632, filed on Oct. 23, 2009.

(51) Int. Cl.
*G01N 21/00*    (2006.01)

(52) U.S. Cl.
USPC ......................................................... 356/73.1

(58) Field of Classification Search
USPC ......................................................... 356/73.1
See application file for complete search history.

(56) References Cited

U.S. PATENT DOCUMENTS

| | | | |
|---|---|---|---|
| 7,199,869 B2 | 4/2007 | MacDougall | |
| 7,355,163 B2 | 4/2008 | Watley | |
| 7,418,171 B2 | 8/2008 | Grattan | |
| 2004/0086245 A1 | 5/2004 | Farroni | |
| 2006/0165344 A1* | 7/2006 | Mendez et al. | 385/13 |
| 2007/0242262 A1* | 10/2007 | MacDougall | 356/73.1 |

* cited by examiner

*Primary Examiner* — Tu Nguyen
(74) *Attorney, Agent, or Firm* — Michael A. Ervin; Kreuger Iselin LLP

(57) ABSTRACT

A Brillouin system for monitoring both temperature and strain includes either a single or double-ended fiber with multiple fiber Bragg gratings (FBG's) at different wavelengths and a pumped seed laser system tunable over a range substantially larger than a Brillouin shift. The FBG's are distributed along the length of the deployed fiber and serve as wavelength selectable reflectors that enable maintaining system operation even in the case of a fiber break.

7 Claims, 4 Drawing Sheets

STIMULATED BRILLOUIN SYSTEM WITH MULTIPLE FBG'S

CROSS REFERENCE TO RELATED APPLICATIONS

This application claims the benefit of U.S. provisional Ser. No. 61/279,632 filed Oct. 23, 2009.

TECHNICAL FIELD

This disclosure relates to distributed measurement systems for measuring temperature and strain and more particularly to methods and systems for improving the reliability of a stimulated Brillouin sensing system by adding redundancy.

BACKGROUND OF THE DISCLOSURE

Both Raman and Brillouin scattering phenomena have been used for distributed temperature monitoring for many years. Raman was first proposed for sensing applications in the 80's, whereas Brillouin was introduced later as a way to enhance the range of Optical Time Domain Reflectometry (OTDR) and then for strain and/or temperature monitoring applications.

Optical fiber sensors based on Brillouin scattering have been used extensively in the measurement of distributed temperature and/or strain. Both the frequency shift and the power of the Brillouin backscatter signal are dependent on temperature and strain. Brillouin scattering can be used in both a stimulated and spontaneous mode for distributed sensors.

Spontaneous scattering uses one laser light at stable wavelength (optical frequency) and measures spectrum of the backscattered light. It has an advantage that there is no need for modulation to sweep in optical frequency, and that the fiber is single ended. The resulting simplicity is a great benefit.

However, it comes with the disadvantage of a low dynamic range. In order to perform spectrum analysis, the detection scheme can become complicated. Further, because the backscattered signal is very weak, the signal-to-noise ratio will be low and it will require long integration time, high number of measurements for averaging, or both.

Stimulated systems are either double ended or make use of a reflective mirror at the end of the fiber coupled with a counter propagating arrangement. Stimulated scattering requires two input lights (probe and pulse), and at least one of them needs to be modulated and swept across optical frequency bandwidth (10-14 GHz). Further, the two input lights need to be counter-propagating in order to produce stimulated scattering, so most of the work in this area have been based on a dual-ended scheme. This gives a much larger dynamic range. A major disadvantage with such a stimulated system is that if a fiber break occurs, the system is lost.

A growing field is the use of Fiber Bragg gratings (FBG's). The physical principle behind the FBG sensor is that a change in strain, stress, or temperature will alter the center of the wavelength of the light reflected from an FBG. A fiber's index of refraction depends on the density of the dopants it contains. FBGs are made by redistributing dopants to create areas that contain greater or lesser amounts, using a technique called laser writing. The FBG wavelength filter consists of a series of perturbations in the index of refraction along the length of the doped optical fiber. This index grating reflects a narrow spectrum that is directly proportional to the period of the index modulation (L) and the effective index of refraction (n).

Because the temperature and strain states of FBGs directly affect their reflectivity spectrum, they can also be used for a variety of sensing applications. As the fiber-optic analogue to conventional electronic sensors, FBGs can serve as strain-gauge sensors to provide structural engineers with measurements not previously possible. Emerging applications include detecting changes in stress in buildings, bridges, and airplane bodies; depth measurements in streams, rivers, and reservoirs for flood control; and temperature and pressure measurements in deep oil wells. The advantages of FBG sensors include: improved accuracy, sensitivity, and immunity to electromagnetic interference, radio-frequency interference, and radiation; the ability to be made into a compact, lightweight, rugged device small enough to be embedded or laminated into structures or substances to create smart materials that can operate in harsh environments—such as underwater—where conventional sensors cannot work; the ability to be multiplexed; ease of installation and use; and potential low cost as a result of high-volume telecommunications manufacturing These features enable using many sensors on a single optical fiber at arbitrary spacing. Using tunable lasers, one can interrogate each sensor independently and obtain a distributed measurement over large structures. Because the gratings are multiplexed on a single fiber, many sensors can be accessed with a single connection to the optical source and detector. Conventional electronic strain gauge sensors require each sensor to have its lead wires attached and routed to the sensor readout. In the application to be discussed the use of spaced FBG's is used in a novel way to achieve a substantial improvement in system reliability in a Brillouin system.

There is a need for a system with the benefits of both a single ended spontaneous system as well as the improved dynamic range of a stimulated Brillouin system.

BRIEF SUMMARY OF THE DISCLOSURE

This need is met by the invention of this disclosure.

The proposed Brillouin system comprises a single ended fiber with multiple fiber Bragg gratings (FBG's) at different wavelengths and a pumped seed laser system tunable over a range substantially larger than a Brillouin shift. The FBG's are distributed along the length of the deployed fiber and serve as wavelength selectable reflectors. A fiber Bragg grating (FBG) is a type of distributed Bragg reflector constructed in a short segment of optical fiber that reflects particular wavelengths of light and transmits all others. This is achieved by adding a periodic variation to the refractive index of the fiber core, which generates a wavelength specific dielectric mirror. A fiber Bragg grating can therefore be used as a wavelength-specific reflector.

When first deployed the system uses the furthest deployed FBG and the system laser is tuned to the frequency of that FBG. If there is no problem with the fiber that configuration remains. If there is a fiber break later in the service life the system laser is then retuned to the remaining furthest FBG—allowing continued stimulated operation on the remaining fiber.

In one aspect the need is provided by a method for improving reliability of a stimulated Brillouin sensing system by adding redundancy including at least the steps of: producing a first optical signal, the first optical signal being tunable over a pre-defined wavelength range; coupling the first optical signal to a fiber optic cable deployed in a region of interest, the deployed fiber optic cable comprising a plurality of spaced fiber Bragg gratings, each fiber Bragg grating having a distinct and known characteristic wavelength of reflection;

tuning the first optical signal to the characteristic wavelength of reflection of a first chosen spaced fiber Bragg grating; producing a second optical signal at a fixed pre-defined wavelength, the pre-defined wavelength being outside the reflection spectrum of any of the spaced fiber Bragg gratings; coupling the second optical signal to the fiber optic cable; receiving a first reflected signal of the first optical signal, the reflected signal being reflected from the first chosen spaced fiber Bragg grating within the deployed optical cable; receiving a second reflected signal of the second optical signal, the second reflected resulting from Brillouin backscattering within the deployed optical fiber; measuring shifts in attributes between the second optical signal and the second reflected signal that are indicative of environmental conditions along the deployed optical fiber; wherein, when a break is detected in the deployed fiber optic cable the first optical signal is re-tuned to the characteristic wavelength of a second chosen spaced fiber Bragg grating.

In another aspect the need is provided by a system for improving reliability of a stimulated Brillouin sensing system by adding redundancy including at least: a tunable probe laser; a fixed frequency pump laser; an acousto-optic modulator to shift the optical frequency of the fixed frequency pump laser to deliver a fixed pre-defined wavelength; a coupler that combines signals from the tunable probe laser and the fixed frequency pump laser and connect to a fiber optic sensor deployed into a field of interest to be measured; a detector for collecting backscattered light from the fiber optic sensor; an acquisition/processing module for analyzing the backscattered light and measures shifts in attributes between the second optical signal and the second reflected signal that are indicative of environmental conditions along the deployed optical fiber wherein the fiber optic sensor comprises a plurality of spaced fiber Bragg gratings, each fiber Bragg grating having a distinct and known characteristic wavelength of reflection; and wherein the fixed pre-defined wavelength from the fixed frequency pump laser and the acoustic optic modulator, lies outside the reflection spectrum of any of the spaced fiber Bragg gratings.

BRIEF DESCRIPTION OF THE SEVERAL VIEWS OF THE DRAWINGS

For a more complete understanding of the present invention, reference is now made to the following drawings, in which.

DETAILED DESCRIPTION

Although certain embodiments of the present invention and their advantages have been described herein in detail, it should be understood that various changes, substitutions and alterations can be made without departing from the spirit and scope of the invention as defined by the appended claims. Moreover, the scope of the present invention is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufactures, means, methods or steps.

Figure 1:
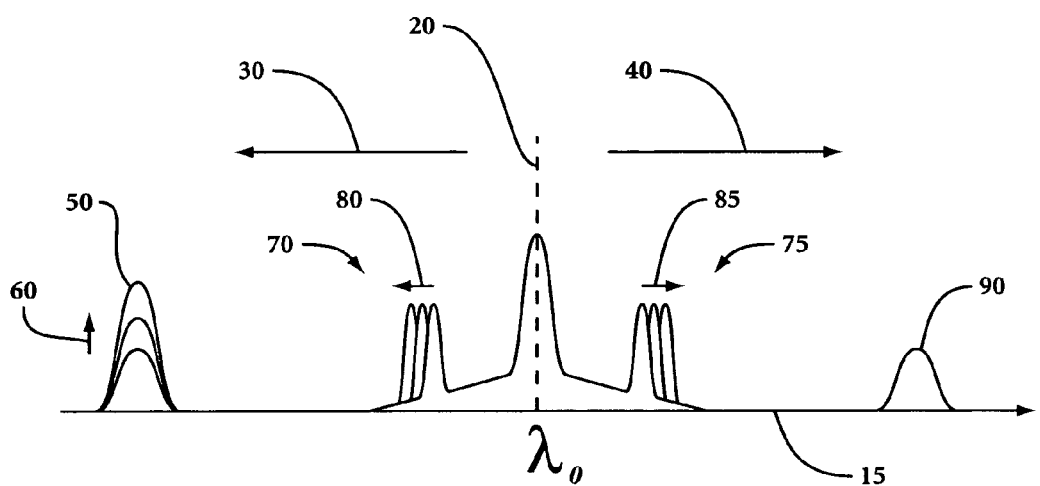
FIG. 1 illustrates the spectrum of scattered light in an optical fiber.

FIG. 1 schematically shows the spectrum of scattered light in optical fibers assuming that a single wavelength $\lambda_0$, shown as 20, is launched in the fiber. All of the components 40 represent Stokes components and all of the components 30 represent Anti-Stokes components. The Raman backscattered light has two frequency shifted components, the Stokes 90 and the Anti-Stokes 50, driven by thermally influenced molecular vibrations. Consequently the backscattered light carries the information on the local temperature where the scattering occurred. The various amplitudes 60 of the Anti-Stokes component 50 are strongly temperature dependent whereas the amplitude of the Stokes component 90 is not. Therefore Raman sensing technique requires some filtering to isolate the relevant frequency components and consists in the recording of the ratio between Anti-Stokes amplitude by the Stokes amplitude, which contains the temperature information. Since the magnitude of the spontaneous Raman backscattered light is quite low, high numerical aperture multimode fibers are used in order to maximize the guided intensity of the backscattered light. However, the relatively high attenuation characteristics of multimode fibers limit the distance range of Raman-based systems to approximately 10 km.

Brillouin scattering is shown as 70 in the Anti-Stokes regime and 75 in the Stokes regime. It occurs as a result of an interaction between the propagating optical signal and thermally acoustic waves in the GHz range present in the silica fiber giving rise to frequency shifted components. It can be seen as the diffraction of light on a moving grating generated by an acoustic wave (an acoustic wave is actually a pressure wave which introduces a modulation of the index of refraction through the elasto-optic effect). The diffracted light experiences a Doppler shift since the grating propagates at the acoustic velocity in the fiber. The acoustic velocity is directly related to the medium density and depends on both temperature and strain. As a result the so-called Brillouin frequency shift carries the information about the local temperature and strain of the fiber. Furthermore, Brillouin-based sensing techniques rely on the measurement of frequency 80 or 85 as opposed to Raman-based techniques, which are intensity based. Brillouin based techniques are consequently inherently more accurate and more stable on the long term, since intensity-based techniques suffer from a higher sensitivity to drifts.

Brillouin scattering has the particularity that it can become a stimulated interaction provided that an optical signal called the probe signal is used in addition to the original optical signal usually called the pump.

The basic configuration of a distributed Brillouin sensor has the following aspects: a strong light pulse, called pump is launched into the fiber. It encounters a weak light wave called probe that propagates in the back direction. Stimulated Brillouin occurs when pump and probe overlap, resulting in an amplification of the probe provided that the difference between the two frequencies lies within the Brillouin gain spectrum.

This interaction causes the coupling between optical pump and probe signals and acoustical waves when a resonance condition is fulfilled, i.e. when the frequency differences between probe and pump light corresponds to the Brillouin frequency shift. It turns out that the resonance condition is strain and temperature-dependent, so that determining the resonance frequency directly provides a measure of temperature or strain. The advantage of measuring the interaction of two optical signals instead of recording the low intensity spontaneously scattered light is that the signal-to-noise ratio is much more comfortable. As a result, the measurement of spontaneous backscattered light required long integrating time, whereas the pump-probe technique doesn't and is therefore very suitable for rapid measurements.

Brillouin-based sensing techniques operates only with single mode optical fibers and thanks to the low loss characteristics of single mode fibers, measurements over several tens of kilometers can be achieved.

Figure 2:
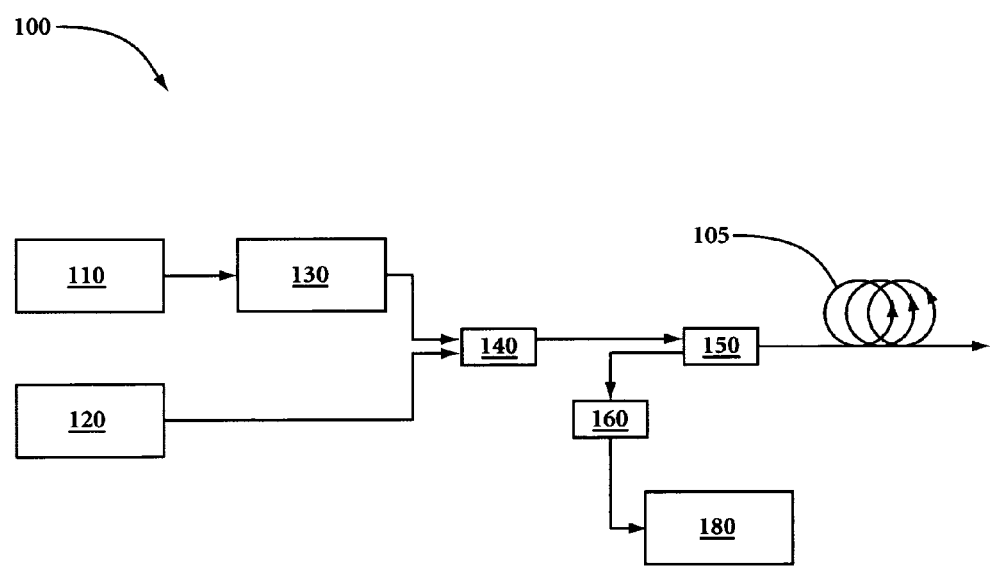
FIG. 2 is an illustration of a pump pulse configuration for implementing a stimulated Brillouin monitoring system.

There are a number of equipment configurations that can be used for achieving stimulated Brillouin based sensing. FIG. 2 illustrates one approach—the use of a tunable probe laser 120 (a first optical signal) and a fixed frequency pump laser 110 in conjunction with an acousto-optic modulator 130 to shift up the optical frequency (a second optical signal). Other approaches include optical ring designs to circulate a signal repeatedly through a modulator to continuously up-shift until a desired frequency is reached. The use of any of these approaches to achieve stimulated Brillouin scattering is anticipated by the concept of this application. The laser power passes through couplers 140, 150 to an extended optical fiber sensor 105 that is deployed into the field of interest for measurement of, for example, temperatures or strains. Backscattered light from the optical fiber sensor passes through detector 160 to an acquisition/processing module 180 for analysis. The acquisition/processing module can use any of the art recognized Brillouin measurement techniques.

Figure 3:
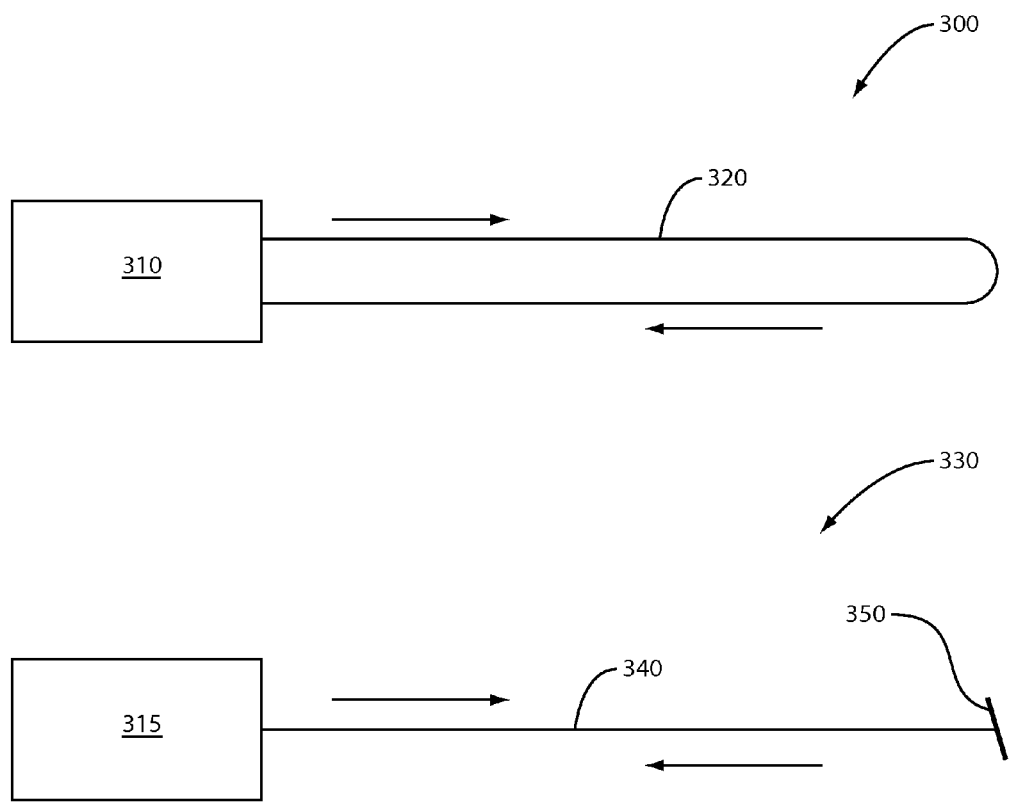
FIG. 3 is an illustration of prior art single and double-ended Brillouin configurations.
Figure 4:
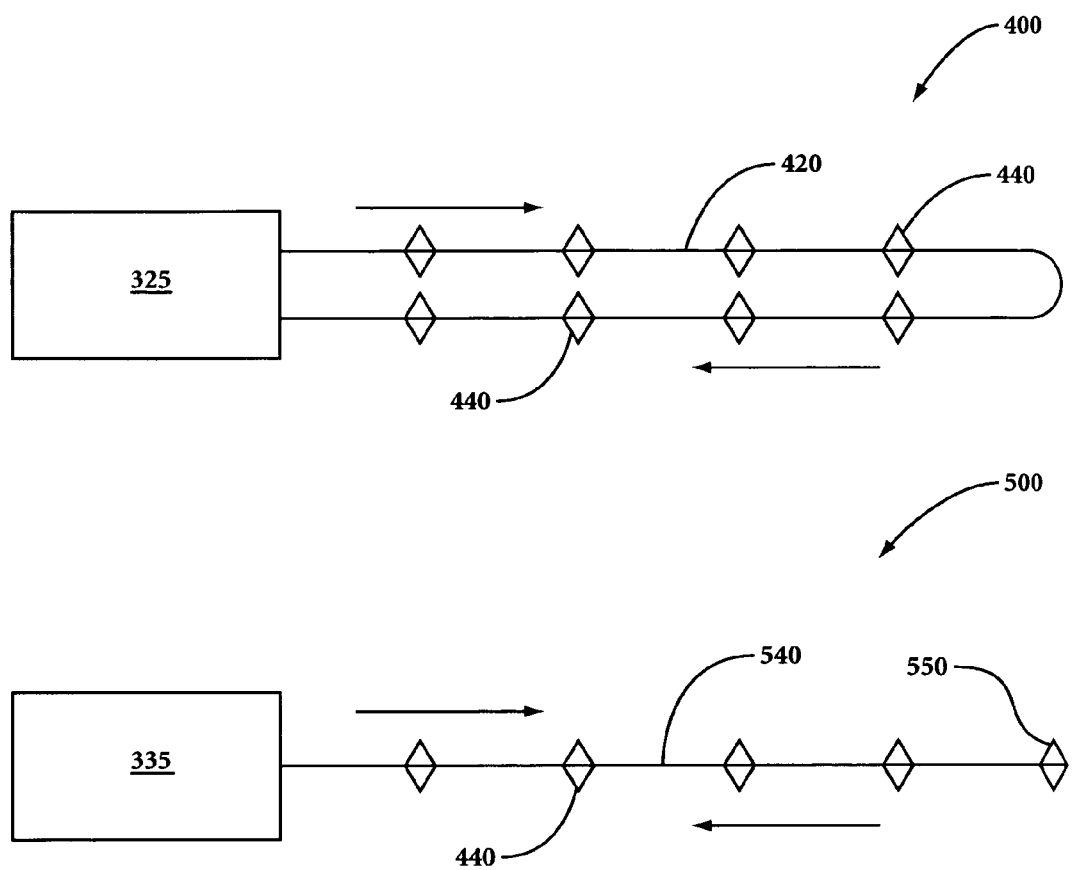
FIG. 4 is an illustration of single and double-ended Brillouin systems of the instant invention.

In FIGS. 3 and 4 the box represented as DMS (Distributed Monitoring System) system 310, 315, 325, 335 can be any of the Brillouin systems discussed previously that can generate the equivalent of a pulse and probe laser at frequencies necessary to achieve stimulated Brillouin measurements. FIG. 3 illustrates two common prior art implementations of Brillouin systems—a double ended system 300, in which the optical fiber 320 is connected at two end to DMS 310 and a single ended system 330 with a reflective mirror 350 at the far end.

FIG. 4 illustrates an embodiment that provides both the enhanced dynamic range and guards against the loss of system if a break should happen. In either the single ended 400 or double ended 500 mode the system has periodic fiber Bragg gratings (FBG's) 440 or 550 acting as mirrors along the complete length of the deployed optic cable 420 or 540. The distributed FBG's serve as wavelength selectable reflectors. Each fiber Bragg grating in this embodiment has a distinct and known characteristic wavelength of reflection. This enables a stimulated Brillouin system at selected points along the system. The tunable laser of the DMS system can be tuned to the particular frequency of each of the specific FBG's using art-recognized methods.

These features enable using many sensors on a single optical fiber at arbitrary spacing. Using tunable lasers, one can interrogate each sensor independently and obtain a distributed measurement over large structures. Because the gratings are multiplexed on a single fiber, many sensors can be accessed with a single connection to the optical source and detector. Conventional electronic strain gauge sensors require each sensor to have its lead wires attached and routed to the sensor readout. In the described embodiment the use of spaced FBG's is used in a novel way to achieve a substantial improvement in system reliability.

Using the single ended system of FIG. 4 as an example, the system can be deployed and the tunable lasers used to tune the entire system for the end FBG 550. If there is a later break in the fiber the system can be immediately retuned to the furthest operable FBG away from the DMS system to allow a stimulated Brillion operation on the remaining fiber. This now makes possible a single ended Brillouin system with the performance and benefits of a stimulated system without the danger of completely losing the system in the case of a fiber break.

In the case of the double-ended system of FIG. 4 the same argument obtains. A break in the double-ended system can also be recovered by using any of the remaining FBG's as wavelength selectable reflectors to continue the use of the stimulated Brillouin system to measure both temperature profile and strain.

The embodiments described provide a stimulated Brillouin system that can be used over long distance to monitor both strain and temperature while providing a high dynamic range and the ability to deal with a fiber break without completely losing system performance.

The invention claimed is:

1. A method for improving reliability of a stimulated Brillouin sensing system by adding redundancy comprising the steps of:
   a. producing a first optical signal, said first optical signal being tunable over a pre-defined wavelength range;
   b. coupling said first optical signal to a fiber optic cable deployed in a region of interest, said deployed fiber optic cable comprising a plurality of spaced fiber Bragg gratings, each fiber Bragg grating having a distinct and known characteristic wavelength of reflection;
   c. tuning said first optical signal to the characteristic wavelength of reflection of a first chosen spaced fiber Bragg grating;
   d. producing a second optical signal at a fixed pre-defined wavelength, said pre-defined wavelength being outside the reflection spectrum of any of said spaced fiber Bragg gratings;
   e. coupling said second optical signal to said fiber optic cable;
   f. receiving a first reflected signal of the first optical signal, said reflected signal being reflected from the first chosen spaced fiber Bragg grating within the deployed optical cable;
   g. receiving a second reflected signal of the second optical signal, the second reflected signal resulting from Brillouin backscattering within the deployed optical fiber;
   h. measuring shifts in attributes between said second optical signal and said second reflected signal that are indicative of environmental conditions along said deployed optical fiber;
      wherein, when a break is detected in said deployed fiber optic cable said first optical signal is re-tuned to the characteristic wavelength of a second chosen spaced fiber Bragg grating.

2. The method of claim 1 further comprising pulsing said second optical signal.

3. The method of claim 1 wherein said first chosen spaced fiber Bragg grating is chosen to be the furthermost deployed fiber Bragg grating in the region of interest.

4. The method of claim 1 wherein after a break is detected in said deployed fiber optic cable, said second chosen spaced fiber Bragg grating is chosen to be the furthermost deployed fiber Bragg grating in the remaining unbroken fiber optic cable.

5. A system for improving reliability of a stimulated Brillouin sensing system by adding redundancy comprising:
   a. a fiber optic cable deployed in a region of interest to be measured, said deployed fiber optic cable comprising a plurality of spaced fiber Bragg gratings, each fiber Bragg grating having a distinct and known characteristic wavelength of reflection;
   b. a tunable probe laser that generates a first optical signal tuned to the furthest operable fiber Bragg grating in the region of interest;
   c. a fixed frequency pump laser;
   d. an acousto-optic modulator to shift the optical frequency of said fixed frequency pump laser to deliver a fixed pre-defined wavelength second optical signal;
   e. a coupler that combines the first and second optical signals from said tunable probe laser and said fixed frequency pump laser and couples to the fiber optic cable deployed into a region of interest to be measured;
   f. a detector for collecting a first reflected signal from the first optical signal from the furthest operable fiber Bragg grating and collecting a second reflected signal of the second optical signal resulting from Brillouin backscattering from the fiber optic cable deployed within the region of interest;
   g. an acquisition/processing module for analyzing said collected reflected light signals and measuring shifts in attributes between said second optical signal and said second reflected signal that are indicative of environmental conditions along said deployed optical fiber;
   h. an wherein said fixed pre-defined wavelength second optical signal from said fixed frequency pump laser and said acoustic optic modulator, lies outside the reflection spectrum of any of said spaced fiber Bragg gratings.

6. The system for improving reliability of a stimulated Brillouin sensing system of claim 5 wherein the fiber optic sensor comprising a plurality of spaced fiber Bragg gratings is a double ended system.

7. The system for improving reliability of a stimulated Brillouin sensing system of claim 5 wherein the fiber optic sensor comprising a plurality of spaced fiber Bragg gratings is a single ended system.

* * * * *